United States Patent [19]
Watson

[11] Patent Number: 5,927,238
[45] Date of Patent: Jul. 27, 1999

[54] VALVE TIMING FOR FOUR STROKE INTERNAL COMBUSTION ENGINES

[75] Inventor: Stephen James Watson, Trigg, Australia

[73] Assignee: Orbital Engine Company (Australia) Pty. Limited, Balcatta, Australia

[21] Appl. No.: 09/029,259

[22] PCT Filed: Sep. 26, 1996

[86] PCT No.: PCT/AU96/00611

§ 371 Date: Mar. 6, 1998

§ 102(e) Date: Mar. 6, 1998

[87] PCT Pub. No.: WO97/12127

PCT Pub. Date: Apr. 3, 1997

[30] Foreign Application Priority Data

Sep. 27, 1995 [AU] Australia ................................ PN5671

[51] Int. Cl.⁶ .............................. F01L 1/40; F01L 31/24; F02B 47/10
[52] U.S. Cl. ................. 123/90.15; 123/90.6; 123/568.14
[58] Field of Search .............................. 123/90.15, 90.16, 123/90.17, 90.6, 568.14

[56] References Cited

U.S. PATENT DOCUMENTS

| | | | |
|---|---|---|---|
| 3,166,057 | 1/1965 | Konrad et al. | 123/90 |
| 3,298,332 | 1/1967 | Elsbett | 123/90.6 |
| 4,424,790 | 1/1984 | Curtil | 123/90.6 |
| 4,620,510 | 11/1986 | Feuling | 123/90.6 |
| 4,722,315 | 2/1988 | Pickel | 123/90.15 |
| 5,020,487 | 6/1991 | Kruger | 123/90.15 |
| 5,031,582 | 7/1991 | Kruger | 123/90.15 |
| 5,103,779 | 4/1992 | Hare, Sr. | 123/90.6 |
| 5,133,310 | 7/1992 | Hitomi et al. | 123/90.15 |
| 5,806,476 | 9/1998 | Hakansson | 123/568.14 |

FOREIGN PATENT DOCUMENTS

| | | |
|---|---|---|
| 0 594 463A1 | 4/1994 | European Pat. Off. . |
| 1 294 821 | 11/1972 | United Kingdom . |
| 1 487 705 | 10/1977 | United Kingdom . |
| 2 134 596 | 8/1984 | United Kingdom . |

OTHER PUBLICATIONS

H. Heisler, "Advanced engine technology", published 1995, by Edward Arnold (London), p. 8, fig. 1.12(d).
Patent Abstracts of Japan, M–537, p. 43, JP 61–145310 A (Nissan Motor Co Ltd) Jul. 3, 1996.

*Primary Examiner*—Weilun Lo
*Attorney, Agent, or Firm*—Nikaido Marmelstein Murray & Oram LLP

[57] ABSTRACT

A method of controlling a four stroke internal combustion engine having at least one combustion chamber, the or each combustion chamber having at least one exhaust valve, the method including varying the timing of the closure of the or each exhaust valve with respect to the crank angle of the engine by advancing the exhaust valve closure at least under certain engine conditions in response to an increased engine load, and/or delaying the exhaust valve closure at least under certain conditions in response to a decreased engine load.

14 Claims, 5 Drawing Sheets

VALVE TIMING FOR FOUR STROKE INTERNAL COMBUSTION ENGINES

BACKGROUND OF THE INVENTION

1. Field of the Invention

The present invention relates generally to four stroke internal combustion engines, and in particular to the valve timing for such engines.

2. Description of Related Art

It is known to recirculate exhaust gases back into engine combustion chamber(s) to assist in reducing overall exhaust emissions, in particular, NOx emissions.

It has been proposed in relation to two-stroke direct injected engines to recirculate exhaust gases back into a combustion chamber by running a separate conduit externally of the combustion chamber from the exhaust manifold back to the combustion chamber and/or intake manifold. See, for example the applicant's earlier international application no. PCT/AU94/00288. However, this process may, in certain applications, have a number of disadvantages. For example, the system is dependent on the pressure of gas in the exhaust manifold being sufficiently higher than that in the intake manifold to attain the required exhaust gas flow through the conduit. In addition, modifications to the engine are required to install such an exhaust gas recycling system.

During each operating cycle of a typical four stroke internal combustion engine, there is a valve overlap period, where both the inlet valve(s) and the exhaust valve(s) of each cylinder are open at the same time. The overlap period helps in the effective flow of gas through the cylinder.

The valve overlap period typically occurs between the opening of the inlet valve(s) and the closing of the exhaust valve(s), the exhaust valve closing after the inlet valve has opened such that both valves are open during the overlap period. Measured in relation to the crank angle of the engine, the inlet valve typically opens at about 10° Before Top Dead Centre (BTDC) and the exhaust valve typically closes at about 10° After Top Dead Centre (ATDC) in a conventional four stroke engine. The crank angle at which exhaust valve closure occurs is usually quite strictly determined to be in the range of between 5° and 15° ATDC in modern four stroke cycle engines, to ensure efficient operation of the engine.

The point of closing of the exhaust valve, particularly at idle and part load, regulates the quantity of exhaust gases that can flow back into the cylinder through the exhaust valve during the induction stroke of the subsequent combustion cycle. It would therefore be advantageous, under certain engine operating conditions, to delay the closing of the exhaust valve to thereby increase the amount of exhaust gases drawn back into the cylinder through the exhaust valve.

There are however limitations in the extent that the closing of the exhaust valve can be delayed in conventional carburettor or intake manifold fuel injected engines as this can lead to combustion instability in conventional four stroke engines. One reason is that the redrawing of exhaust gas into the cylinder can displace fresh fuel and air charge entrained in the bulk air intake, leading to increased combustion instability. Furthermore, if the valve overlap period in a conventional four stroke internal combustion engine is too long, fresh charge can "short circuit", passing directly from the inlet port to the exhaust port without participating in a combustion event. Clearly, this can result in significant fuel wastage as well as lead to increased HC emissions.

It is an object of the present invention to provide an improved method of controlling the operation of a four stoke internal combustion engine.

SUMMARY OF THE INVENTION

With this in mind, the present invention provides a method of controlling a four stroke internal combustion engine having at least one combustion chamber, the at least one combustion chamber having at least one exhaust valve, the method including varying the timing of the closure of the at least one exhaust valve with respect to the crank angle of the engine by advancing the exhaust valve closure at least under certain engine conditions in response to an increased engine load, and/or delaying the exhaust valve closure at least under certain engine conditions in response to a decreased engine load, wherein the timing of the exhaust valve closure varies from about 20° ATDC at a maximum engine load or at wide open throttle of the engine, to up to about 180° ATDC at idle or at low engine loads.

Particularly at low engine speeds, exhaust valve closure timing has a significant effect on engine torque. For maximum torque at low speed, it is beneficial to advance the closure of the exhaust valve. For low torque, low speed operation, the closure of the exhaust valve is delayed, preferably as far as possible without affecting combustion stability. This reduces pumping losses of the engine thereby reducing fuel consumption.

Alternatively, the timing of the exhaust valve closure may vary from about 35° ATDC at a maximum engine load or at wide open throttle of the engine, to up to about 180° ATDC at idle or at low engine loads. Alternatively, the timing of the exhaust valve closure may be limited to about 70° ATDC when the engine is at idle or at low engine loads.

The variation of the exhaust valve closure angle between advanced and delayed may be essentially linear with respect to the variation in the engine load.

Preferably, the crank angle at which exhaust valve closure occurs is determined from a look-up map dependent on engine operating parameters such as engine speed and load.

According to a further aspect of the present invention, there is provided a method of controlling a four stroke engine having at least one combustion chamber, the at least one combustion chamber having at least one exhaust valve, the method including varying the timing of the closure of the at least one exhaust valve with respect to the crank angle of the engine by advancing the exhaust valve closure at least under certain engine conditions in response to an increased engine load, and/or delaying the exhaust valve closure at least under certain engine conditions in response to a decreased engine load, the exhaust valve closure timing being at least 30° ATDC.

The four stroke internal combustion engine may include control means for varying the timing of the closure of the or each exhaust valve in response to changes in the load of the engine.

The or each exhaust valve may be actuated by a cam on a camshaft. The control means may include an auxiliary cam lobe provided on the cam in addition to its primary cam lobe. This auxiliary cam lobe may be moveable between a retracted position and an extended position whereby the auxiliary cam lobe extends beyond the actuating surface of the cam to selectively supplement the lift provided to the exhaust valve by the primary lobe, and thereby control the exhaust valve closing point with respect to the crank angle of the engine. In an alternative embodiment, the auxiliary cam lobe may be fixed on the cam such that the exhaust valve timing is permanently set.

Preferably, the auxiliary cam lobe lift comes into effect prior to the completion of primary cam lobe lift, maintaining the exhaust valve in the open position from the initial opening by the primary cam lobe to closure when the auxiliary cam lobe ceases to have effect. Alternatively, the auxiliary cam lobe may be operable to open the exhaust valve after the primary cam lobe has completed its lift function. In this case, the exhaust valve will close momentarily before being reopened by the auxiliary cam lobe. In this case, the closure of the exhaust valve for the purposes of this invention is considered to be the closure after any lift provided by the auxiliary cam lobe.

Preferably, the exhaust valve lift provided by the auxiliary cam is not as great as the lift provided by the primary cam.

The auxiliary cam lobe may be selectively operable by a hydraulic mechanism operating within the body of the cam. Hydraulic oil may be supplied through the centre of the camshaft to the cam body for this purpose. The auxiliary cam may also be actuated by compressed air (typically 600–700 KPa) possibly supplied from an existing compressor. Such a compressor may have a primary function, for example, of supplying air for a dual fluid fuel injection system.

The above arrangements provide a preset change in the exhaust valve closure timing. The present invention is however not restricted to such preset values, and the exhaust valve closure timing can be at least substantially continuously varied between a range of settings. This may for example be achieved by providing electrical actuation of each exhaust valve in place of the cams to enable the timing of the exhaust valve closure to be varied. Solenoid actuators can for example be provided for each exhaust valve.

Preferably, the engine includes a dual fluid fuel injection system. The injection system may be of the type described in the applicant's earlier International patent applications PCT/AU84/00150 and PCT/AU88/00096. As fuel injection can thereby be accurately timed, the possibility of escape of fuel directly to the engine exhaust system can be simply eliminated by injecting the fuel at such a time that it cannot escape from the combustion chamber, for example after the exhaust valve has closed. It is not possible in a conventional four stroke engine, where fuel is drawn into the cylinder through the main air inlet port as a homogenous mixture with the bulk air supply, to delay fuel intake sufficiently without risking short-circuit problems when closure of the exhaust valve is substantially delayed. Similar advantages can also be gained using a single fluid fuel injection system.

In the dual fluid fuel system as developed by the applicant, fuel entrained in compressed air is injected into the cylinder (or combustion chamber) separately from the bulk air intake. At low loads, the fuel is injected into the combustion chamber in a highly stratified manner. The combustion of the majority of fuel is thus substantially restricted to the part of the combustion chamber where the stratified fuel is deposited by an injector of the fuel delivery system. As a result, a substantial amount of exhaust gas from the previous combustion cycle can be returned to the combustion chamber without significantly affecting the combustion process in the following cycle.

Fuel supply to the combustion chamber preferably occurs by direct injection to the chamber, but may also occur via the inlet manifold if the fuel supply to the manifold is highly controlled, for example, being supplied through a fuel injection system. The fuel used in the present system may be gasoline, LPG, or any other fuel suitable for use in four stroke cycle engines.

Advantageously, it is preferred, in the operation of any aspect of the invention, that fuel is not short-circuited from the fuel supply to the exhaust system without participating in a combustion event.

In addition to the advantages in emission control gained by delaying closure of the exhaust valve, the delay can also significantly reduce the work done by the piston in drawing gases into the combustion chamber. As a result of the delay, the abovementioned overlap period when both inlet and exhaust valves are open, can be extended further into the induction stroke. This effectively increases the valve open area through which gas can be drawn into the cylinder. As the delay in closure of the exhaust valve increases, less work is expended by the engine during the induction stroke.

BRIEF DESCRIPTION OF THE DRAWINGS

The invention will be more readily understood from the following description of a preferred method of and means for controlling a four stroke engine with reference to the accompanying drawings.

In the drawings.

DESCRIPTION OF THE PREFERRED EMBODIMENTS

Figure 1:
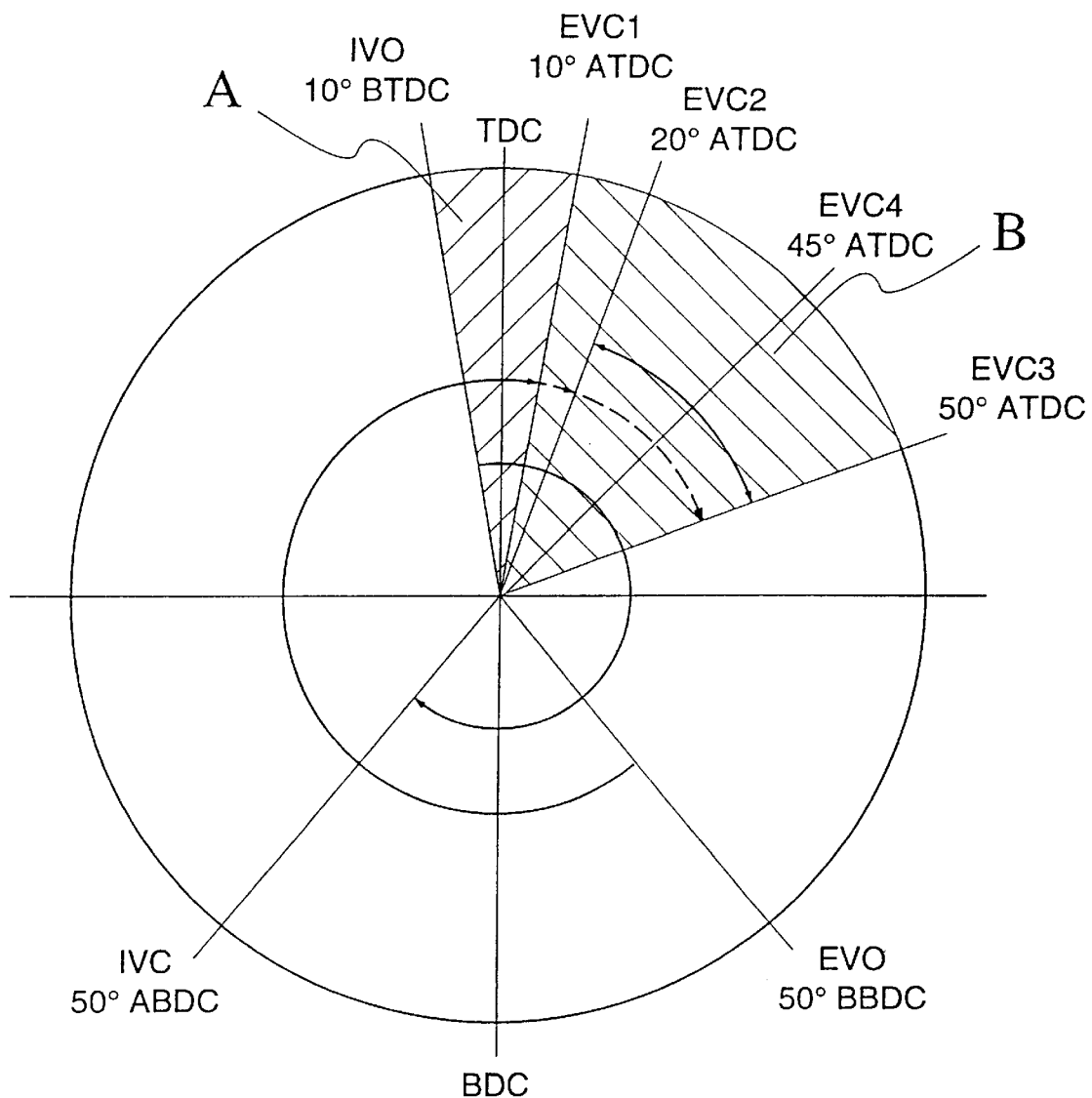
FIG. 1 is a valve timing diagram showing the typical valve timings for a conventional four stoke internal combustion engine and the exhaust valve timing of various embodiments of the method according to the present invention.

Referring initially to FIG. 1, the valve timing diagram shows the typical valve timing of both the inlet valve and the exhaust valve of one cylinder of a typical four stroke internal combustion engine. The opening of the inlet valve (IVO) typically occurs about 10° Before Top Dead Centre (BTDC). The closing of the inlet valve (IVC) typically occurs at about 50° After Bottom Dead Centre (ABDC).

The opening of the exhaust valve (EVO) typically occurs at about 50° Before Bottom Dead Centre (BBDC). Conventional system exhaust valve closure EVC1 typically occurs at about 10° After Top Dead Centre (ATDC).

It is necessary, in order to avoid fuel economy and hydrocarbon emission problems, particularly for low load/ speed operation, not to delay EVC1 beyond about 10° ATDC in most engine applications. This valve timing provides a short overlap period A, wherein both the inlet and exhaust valves are open at the same time.

According to a first embodiment of the present invention, the exhaust valve closure can be varied between unextended EVC2 (approx 20° ATDC) and fully extended EVC3 (approx 70° ATDC). Thus, the overlap duration is extended by an amount up to that indicated by B. In this embodiment, the exhaust valve closure is delayed to 70° ATDC when the engine is operating under low loads or at idle. As greater load is applied to the engine, the delay in closing of the exhaust valve is shortened, advancing the closure of the exhaust valve. At maximum load or wide open throttle, the exhaust valve closure is advanced to 20° ATDC. When load is subsequently reduced, exhaust valve closure is again delayed.

In other embodiments, exhaust valve closure EVC3 can be delayed to up to 180° ATDC (i.e. Bottom Dead Centre). Exhaust valve closure at high loads EVC2 can also be set at more delayed timings, and a typical value would be 35° ATDC. Thus, in another embodiment, exhaust valve closure varies between 35° ATDC and 180° ATDC.

In an alternative method according to the invention, exhaust valve closure is fixed at EVC4, which is set at 45° ATDC. This value is a compromise between the benefits of long exhaust valve closure delay at low load and the preference of shorter delays at high loads. The capability of the present system in allowing long exhaust valve closure delays at low loads, results in a compromise exhaust valve closure timing which is set at a significantly delayed time in relation to the ideal maximum load or wide open throttle exhaust valve closure. In conventional systems, ideal exhaust valve closure at low load would occur at an advanced crank angle with respect to ideal maximum load exhaust valve closure. Thus, a compromise in exhaust valve timing would result in actual exhaust valve closure prior to the ideal maximum load exhaust valve closure, reducing the desired exhaust valve closure delay.

Figure 2:
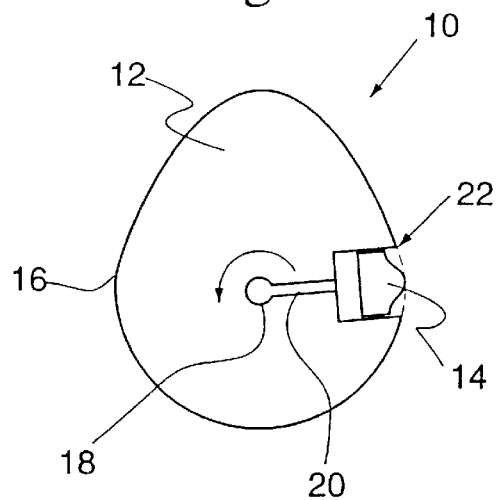
FIG. 2 is a schematic cross-sectional view of a cam with a primary cam lobe and an auxiliary cam lobe according to an embodiment of the present invention.
Figure 3:
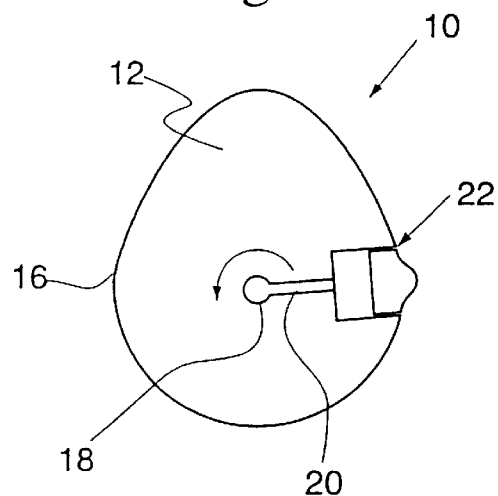
FIG. 3 is a schematic cross-sectional view of the cam of FIG. 2, showing the auxiliary cam lobe in an extended position.
Figure 4:
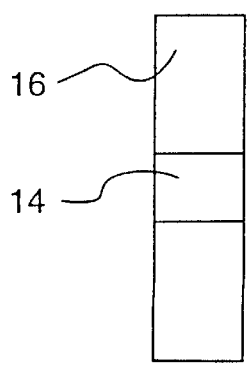
FIG. 4 is a schematic front view of the cam of FIG. 2.

In a typical four stroke engine, the exhaust valves are cam shaft actuated, with cams on the camshaft typically engaging a cam follower of a valve tappet which in turn controls exhaust valve lift. A cam 10 according to the present invention is shown in FIGS. 2 to 4. The cam 10 includes a primary cam lobe 12 and an auxiliary cam lobe 14. The cam 10 provides an actuating surface 16 which typically engages the cam follower of the valve tappet to thereby actuate the exhaust valve.

FIG. 2 shows the auxiliary cam lobe 14 in a retracted position. This auxiliary lobe 14 can be moved to an extended position as shown in FIG. 3 to supplement the lift provided to the exhaust valve by the primary cam lobe 12. A central hydraulic oil supply 18 can be provided along the cam shaft with a separate hydraulic supply line 20 being provided within each cam 12 to the auxiliary cam lobe 14. Oil is supplied to the hydraulic supply line 20 when the auxiliary cam lobe 14 is to be extended.

Figure 6:
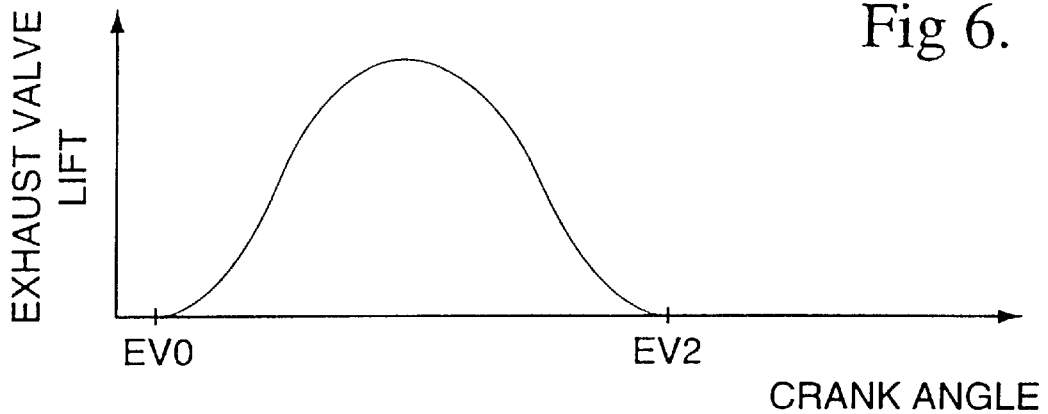
FIG. 6 is a graph plotting exhaust valve lift against crank angle for a cam similar to that of FIGS. 4 or 5, wherein the auxiliary cam lobe has not been actuated.

When the auxiliary cam lobe 14 is in its retracted position, the valve lift is solely effected by the primary cam lobe 12. FIG. 6 shows the exhaust valve lift as a function of the crank angle of the engine when the auxiliary cam lobe 14 is fully retracted. The exhaust valve closes at EVC2 which in this embodiment is 35° ATDC, and there is no supplementary valve lift.

Figure 7:
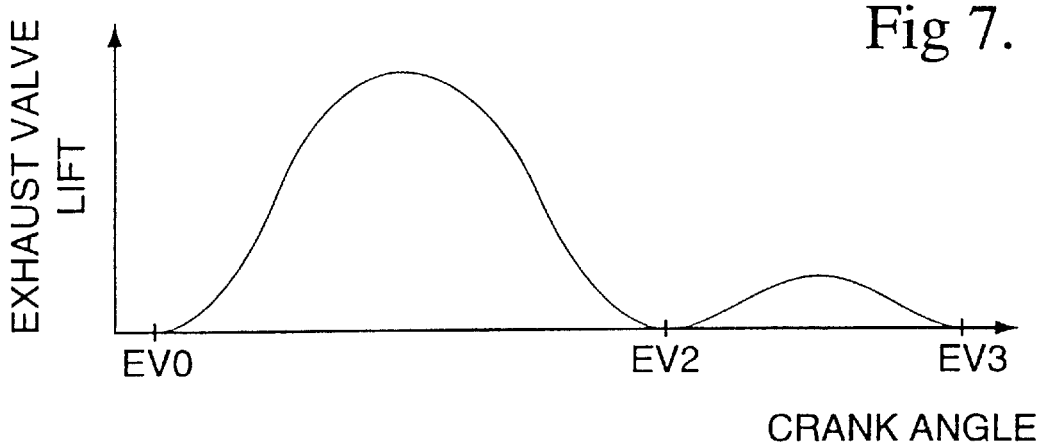
FIGS. 7 and 8 are graphs approximately plotting exhaust valve lift against crank angle for the cams of FIGS. 4 and 5 respectively, wherein the auxiliary cam lobe is fully extended.

Extension of the auxiliary cam lobe 14 results in a change in the exhaust valve lift as shown in FIG. 7. Point 22 on the cam actuating surface 16 as shown in FIGS. 2 and 3 is a point of zero valve lift. At this point the exhaust valve is fully seated and this occurs at EVC2 (20–35° ATDC) as shown in FIGS. 6 and 7. However, because the auxiliary cam lobe 14 is extended, there is a supplementary exhaust valve lift to EVC3 (70–180° ATDC) as shown in FIG. 7.

Because the exhaust valve is at zero lift at point 22 of the cam actuating surface 16, the operation of the cam follower of the valve tappet will not be affected by the lack of support immediately following point 22 when the auxiliary cam lobe 14 is not in the extended position.

Figure 5:
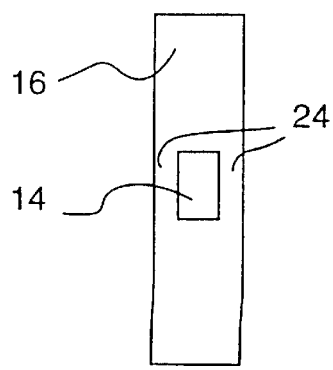
FIG. 5 is a schematic front view of an alternative form of a cam, similar to that of FIG. 2.

In an alternative form of the cam 10 according to the present invention as shown in FIG. 5, supplementary cam surfaces 24 are provided on opposing sides of the auxiliary cam lobe 14. These supplementary cam surfaces 24 act to support the cam follower when the auxiliary cam lobe 14 is not extended. This thereby allows the auxiliary cam lobe 14 to be positioned at any convenient location around the periphery of the cam 10 because the supplementary cam surfaces 24 support the cam follower when the auxiliary cam lobe 14 is not extended. The exhaust valve therefore does not need to be fully seated when the cam follower returns to the location of the auxiliary cam lobe 14. This enables the exhaust valve lift to be varied such that the exhaust valve remains open continuously to EVC3 (70–180° ATDC), as shown in FIG. 8.

Figure 8:
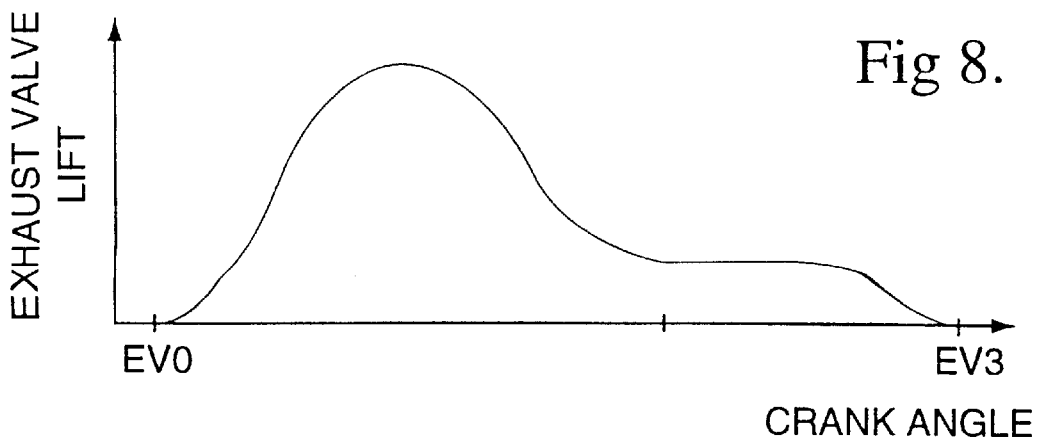

It is preferable that the exhaust valve lift after the inlet valve opens is less than the peak lift of the exhaust valve as shown in FIG. 8. In this way, exhaust gas recirculation through the exhaust valve is restricted somewhat, and the amount of exhaust gas flowing through the exhaust valve can be more tightly controlled by the adjustment of the exhaust valve timing.

Figure 10:
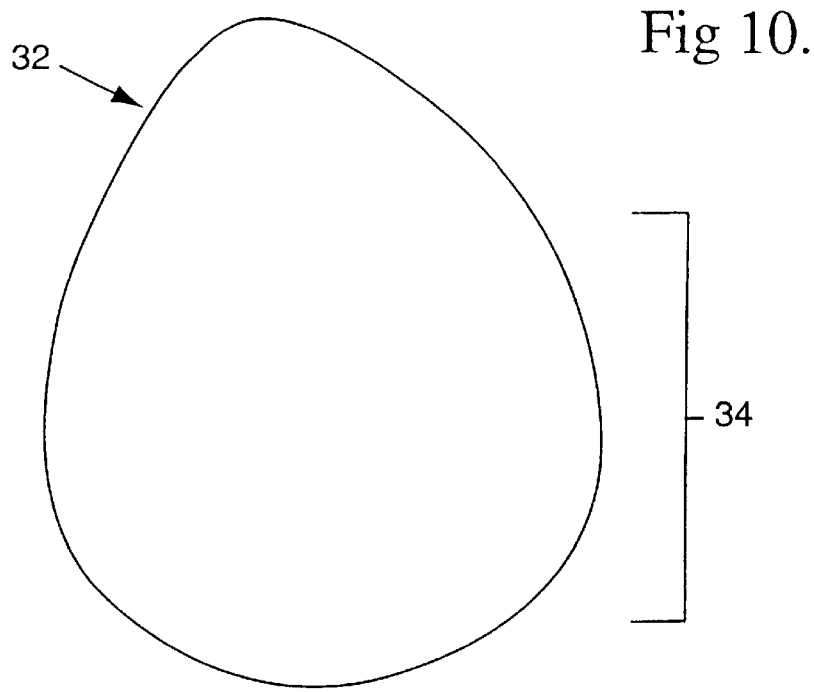
FIGS. 9 and 10 are respective profile views of solid cams corresponding approximately to the graphs of FIGS. 7 and 8.
Figure 9:
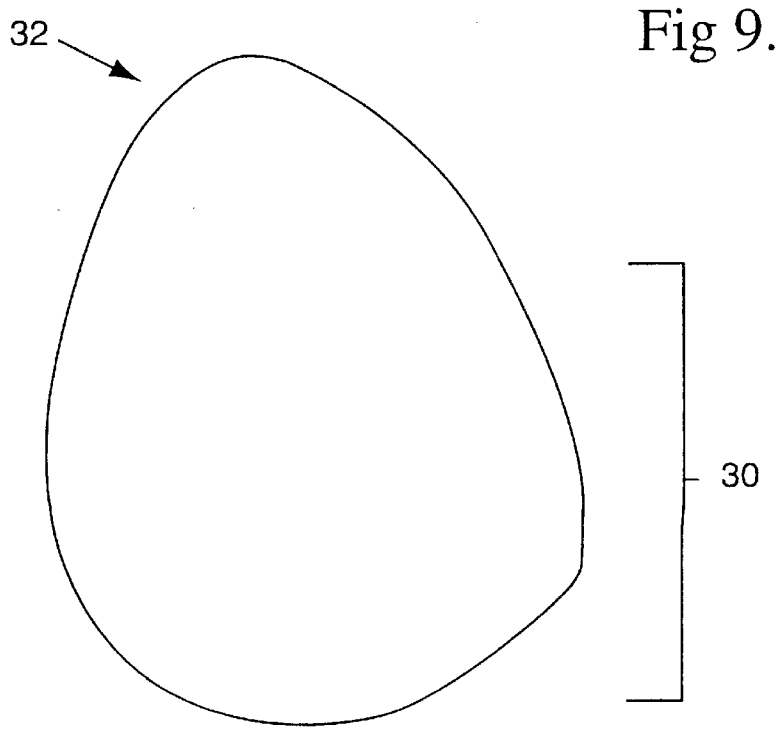

Referring now to FIGS. 9 and 10, exemplary forms of two solid cam profiles are shown. The cam of FIG. 9 in use produces an exhaust valve lift v crank angle plot similar to that shown in FIG. 7, whilst the cam of FIG. 10 produces an exhaust valve lift v crank angle plot similar to that of FIG. 8. These cam profiles can be used in solid cam constructions as shown, and can also be adapted for use in auxiliary cam lobe constructions.

The cam construction of FIG. 9 has a permanent additional raised cam portion generally indicated by the numeral 30, and not present on a standard cam. In this embodiment, the additional portion 30 supplements the exhaust valve timing by lifting the exhaust valve after the standard cam lobe 32 has finished its lift. The cam construction of FIG. 10 also has a permanent additional cam portion, shown at 34. In this embodiment, the additional portion 34 complements the standard cam lobe 32 and maintains a low exhaust valve lift for an extended period, rather than relifting the exhaust valve as occurs with the cam of FIG. 9.

Figure 11:
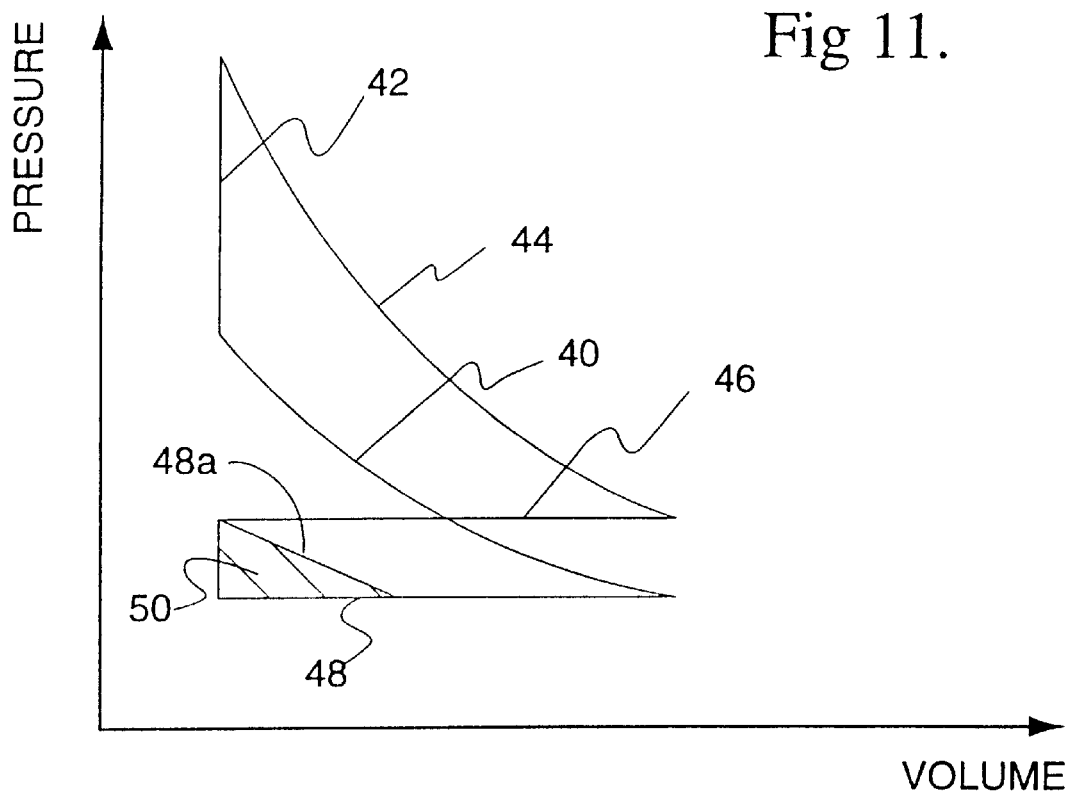
FIG. 11 is a graph plotting pressure against volume for an Otto cycle engine and showing the effect on suction work of an embodiment of the present invention.

FIG. 11 shows the theoretical Otto cycle for a four stroke engine, including the compression stroke 40, combustion 42, expansion stroke 44, exhaust stroke 46, and inlet stroke 48. Particularly at low loads, a substantial amount of work is expended in drawing gas into the combustion chamber during the inlet stroke 48. The amount of work expended in this way corresponds to the area on the graph between lines 46 and 48 (the inlet and exhaust strokes). In delaying exhaust valve closure, the inlet stroke path is altered to that indicated by 48a. This reduces the area on the graph between the inlet stroke line 48 and exhaust stroke line 46 by an amount indicated by shaded area 50. A corresponding reduction in pumping work is thus achieved, and fuel consumption is reduced.

The present invention therefore provides for a delay in the timing of the exhaust valve closure as the engine load decreases and/or allows advancement of the timing of the exhaust valve closure as the load is increased. In an alternative arrangement, the timing of the exhaust valve closure can be delayed to a fixed crank angle later than has generally been usefully possible in conventional four stroke engines.

What is claimed is:

1. A method of controlling a four stroke internal combustion engine having at least one combustion chamber, the at least one combustion chamber having at least one exhaust valve, the method including varying the timing of the closure of the at least one exhaust valve with respect to the crank angle of the engine by advancing the exhaust valve closure at least under certain engine conditions in response to an increased engine load, and/or delaying the exhaust valve closure at least under certain engine conditions in response to a decreased engine load, wherein the timing of the exhaust valve closure varies from about 20° ATDC at a maximum engine load or at wide open throttle of the engine, to up to about 180° ATDC at idle or at low engine loads.

2. A method according to claim 1 wherein the timing of the exhaust valve closure varies from about 35° ATDC at a maximum engine load or at wide open throttle of the engine, to up to about 180° ATDC at idle or at low engine loads.

3. A method according to claim 2 wherein the exhaust valve closure is delayed to about 70° ATDC when the engine is at idle or at low engine loads.

4. A method according to claim 1 wherein the variation of the timing of the exhaust valve closure between advanced and delayed is essentially linear with respect to the variation in the engine load.

5. A method according to claim 1 wherein the timing of the exhaust valve closure is determined from a look-up map as a function of engine operating parameters such as the engine speed and load.

6. A method of controlling a four stroke engine having at least one combustion chamber, the at least one combustion chamber having at least one exhaust valve, the method including varying the timing of the closure of the at least one exhaust valve with respect to the crank angle of the engine by advancing the exhaust valve closure at least under certain engine conditions in response to an increased engine load, and/or delaying the exhaust valve closure at least under certain engine conditions in response to a decreased engine load, the exhaust valve closure timing being at least 30° ATDC to up to about 180° ATDC at idle or at low engine loads.

7. A method according to claim 1 wherein the engine includes control means for varying the timing of the closure of the at least one exhaust valve in response to changes in the load of the engine.

8. A method according to claim 7 wherein the at least one exhaust valve is actuated by a cam on a camshaft of the engine, the cam including a primary cam lobe, the control means including an auxiliary cam lobe provided on the cam.

9. A method according to claim 8 wherein the auxiliary cam lobe is moveable between a retracted position and an extended position whereby the auxiliary lobe extends beyond an actuating surface of the cam to selectively supplement the lift provided to the exhaust valve by the primary cam lobe.

10. A method according to claim 9 wherein the lift provided by the auxiliary cam lobe comes into effect prior to the completion of the lift provided by the primary cam lobe.

11. A method according to claim 9 wherein the lift provided by the auxiliary cam lobe comes into effect after the completion of the lift provided by the primary cam lobe.

12. A method according to claim 7 wherein the lift provided by the auxiliary cam lobe is less than the lift provided by the primary cam lobe.

13. A method according to claim 7 wherein the control means includes electrical actuation means for the at least one exhaust valve.

14. A method according to claim 1 wherein the engine includes a dual fuel injection system.

* * * * *